(12) United States Patent
Mitchell (10) Patent No.: US 8,851,255 B2
(45) Date of Patent: Oct. 7, 2014

(54) RATCHET LOAD BINDER WITH REMOVABLE LEVER

(75) Inventor: Vince Mitchell, Abbotsford (CA)

(73) Assignee: Quality Chain Canada Ltd., Surrey, BC (CA)

( * ) Notice: Subject to any disclaimer, the term of this patent is extended or adjusted under 35 U.S.C. 154(b) by 245 days.

(21) Appl. No.: 13/566,046

(22) Filed: Aug. 3, 2012

(65) Prior Publication Data

US 2013/0140124 A1 Jun. 6, 2013

(30) Foreign Application Priority Data

Dec. 2, 2011 (CA) .................................... 2760240

(51) Int. Cl.
*F16D 41/14* (2006.01)
*F16D 41/16* (2006.01)
*F16G 11/12* (2006.01)

(52) U.S. Cl.
USPC ......... 192/43.1; 254/235; 24/68 D; 24/68 CT (58) Field of Classification Search
CPC ...... B60P 7/0853; B25B 13/468; F16D 41/14
USPC ............... 192/43.1; 254/235; 24/68 CT, 68 D
See application file for complete search history.

(56) References Cited

U.S. PATENT DOCUMENTS

| | | | |
|---|---|---|---|
| 1,680,515 A * | 8/1928 | Gormley | 192/43.1 |
| 1,732,789 A * | 10/1929 | Cornelius | 254/234 |
| 2,220,288 A * | 11/1940 | Sarosdy | 254/232 |
| 2,673,632 A | 3/1954 | Stiranka | |
| 3,338,359 A | 8/1967 | Baillie et al. | |
| 4,069,902 A * | 1/1978 | Zdeb | 192/43 |
| 4,157,171 A | 6/1979 | Hasselås | |
| 4,274,311 A * | 6/1981 | Ebert | 81/63 |
| 4,510,651 A | 4/1985 | Prete, Jr. et al. | |
| 5,611,521 A | 3/1997 | Grover et al. | |
| 6,116,580 A | 9/2000 | Hull | |
| 7,055,804 B2 | 6/2006 | Scott | |
| 7,229,065 B2 | 6/2007 | Scott et al. | |
| 7,451,962 B1 | 11/2008 | Kennedy | |
| 7,513,484 B1 | 4/2009 | Selby | |
| 7,552,913 B1 | 6/2009 | Amoss et al. | |

FOREIGN PATENT DOCUMENTS

| | | |
|---|---|---|
| CA | 2557638 | 3/2007 |
| WO | 2005/102556 | 11/2005 |

* cited by examiner

Primary Examiner — Richard M. Lorence
(74) Attorney, Agent, or Firm — PatentVentures; Bennett Smith; Korbin Van Dyke (57) ABSTRACT

A ratchet assembly for a load binder includes a pawl bearing assembly biased between a surface of the pawl and a biased movable element whose movement is actuated by the insertion or withdrawal of the lever. In one position of the movable element, the bearing assembly is urged against the pawl to lock it. In the other position of the movable element, the bearing assembly is allowed to reduce its pressure on the pawl.

11 Claims, 14 Drawing Sheets

RATCHET LOAD BINDER WITH REMOVABLE LEVER

FIELD OF THE INVENTION

This invention relates to load binder ratchet systems. In particular, this invention relates to load binder ratchet systems with removable levers.

BACKGROUND OF THE INVENTION

A load binder is typically associated with a ratchet system for tightening the binding on the load. Where large loads are involved and the ratchet is operated manually, a lever is often used. It is known to provide removable levers that allow the remaining ratchet system to keep a lower profile to the load than if the lever were still attached. An example of a removable lever is disclosed in U.S. Pat. No. 4,510,651 to Prete Jr. et al. A number of ratchet systems with removable levers are available in the marketplace.

The load binders for large, tightly bound loads can be dangerous. Should the tension on the load binder be suddenly released, the backlash can easily injure or kill an operator or a person attempting to steal the load. Such a risk is minimized using a sleeve the interior of which is threaded in opposite senses at each end of the sleeve as exemplified in U.S. Pat. No. 2,673,632 to Stiranka, U.S. Pat. No. 7,552,913 to Amoss et al. and U.S. Pat. No. 7,055,804 to Scott. Turning the sleeve either draws or extends the threaded eyelets at each end towards or away from each other. Such a threaded sleeve can effectively not be turned accidentally.

When a load has been tightened and the lever is to be removed, the pawl is usually left in its last position wherein the tension on the lines and on the gear will hold the pawl in place, thereby providing a slight locking effect on the pawl. However such effect is fairly small and can be sometimes be overcome by manipulation of the pawl into the neutral or release positions. As a result, the load binder or even the load may be subject to theft. In some cases, operators install a padlock on the ratchet system to prevent tampering with the load binder as can be seen in U.S. Pat. No. 7,055,804 to Scott. As might be appreciated, the use of a padlock can be cumbersome.

It is an object of this invention to provide a ratchet system for accommodating a removable lever that is easy to use, provides a locking effect on the pawl and avoids the need to use a padlock.

Those and other objects of the invention will be better understood by reference to the detailed description of the preferred embodiment which follows.

SUMMARY OF THE INVENTION

According to the invention, the ratchet includes a pawl locking assembly that is engaged by the removal of lever from the ratchet.

More specifically, the pawl locking assembly comprises a pawl bearing assembly biased between a surface of the pawl and a biased movable element whose movement is actuated by the insertion or withdrawal of the lever. In one position of the movable element, the bearing assembly is urged against the pawl. In another position of the movable element, the bearing assembly is allowed to reduce its pressure on the pawl.

The movable element may comprise a varying shape along its contact surface with the bearing assembly such that the pressure exerted on the bearing assembly, and therefore on the pawl, varies according to the position of the movable element.

According to the preferred embodiment, the movable element is elongated and translates axially along a bore and against a spring bias when the lever is inserted onto the ratchet. In its fully inserted position, the movable element urges the bearing assembly against the pawl. In its extended position, the movable element allows the bearing assembly to reduce its pressure on the pawl.

The foregoing embodiment admits of a movable element whose end presses axially on the bearing assembly with more or less force depending on the axial position of the element. However, in the preferred embodiment, the movable element moves axially but the bearing assembly abuts the side of the movable element. According to that embodiment, one portion of the movable element (a contact surface that abuts the bearing assembly) is radially farther from the longitudinal axis of the movable element than another portion of the contact surface, with a section between the two portions having a graduating radial distance. Movement of the element axially thereby exerts greater or less pressure on the radially-abutting bearing assembly, which in turn exerts greater or less pressure on the pawl.

Preferably the bearing assembly is biased (for example by means of a spring) to extend components of the bearing assembly away from one another to release pressure on the pawl in the extended configuration. In the compressed configuration (caused by abutment with the relatively larger contact surface of the movable element), the bearing assembly will exert relatively more force against the pawl.

Preferably, the movable element is biased (for example by means of a spring) to an extended position in which the pressure on the bearing assembly is maximized.

One aspect of the invention comprises a ratchet assembly. The assembly has a housing, a gear, teeth on the gear and a pawl rotatably mounted for reciprocating engagement between the teeth. A lever is adapted for selective connection to or removal from the housing. A pawl bearing assembly extends between a surface of the pawl and a biased movable element whose movement is actuated by the connection or removal of the lever from the housing.

In a more particular aspect of the invention, the pawl bearing assembly is biased toward exerting a bearing pressure on the surface of the pawl.

In a further aspect, the movable element has an extended position in which a portion thereof extends outside the housing and an inserted position in which the portion is in the housing. The bearing pressure of the bearing assembly on the surface of the pawl is greater when the movable element is in the extended position than when it is in the inserted position.

In a further aspect of the invention, the housing is provided with a shaped portion for removably receiving the lever. The movable element has an extended position in which a portion thereof extends outside the housing and an inserted position in which the portion is in the housing. The connection of the lever to the shaped portion causes the insertion of the otherwise protruding portion of the movable element into the housing.

In a further aspect, the movable element has at least two positions in relation to the housing and a contact surface in engagement with the bearing assembly. The contact surface varies axially along a length of the movable element such that a pressure exerted by the movable element on the bearing assembly, and therefore on the pawl, varies according to the position of the movable element.

In yet another aspect, the invention comprises a ratchet assembly in which the movable element is elongated and has a contact surface in engagement with the bearing assembly. The contact surface varies axially along a length of the movable element such that a pressure exerted by the movable element on the bearing assembly, and therefore on the pawl, varies according to whether the movable element is in an extended or in an inserted position. The movable element is translated axially along a bore in the housing to the inserted position when the lever is connected to the housing.

In the extended position of the movable element, a first portion of the contact surface abuts the bearing assembly. In the inserted position, a second portion of the contact surface abuts the bearing assembly. The second portion of the contact surface is closer to a longitudinal axis of the movable element than the first portion.

Preferably, the bearing assembly comprises two components that are spring biased to extend away from one another.

In yet another aspect, the invention comprises a ratchet assembly comprising a housing, a gear, gear teeth and a pawl rotatably mounted for reciprocating engagement between the gear teeth. A pawl bearing assembly extends between a surface of the pawl and a biased movable element whose movement is actuated by the connection or removal of a lever from the housing. The pawl bearing assembly is biased toward exerting a bearing pressure on the surface of the pawl. The movable element has a first position in relation to the housing in which a contact surface of the movable element abuts the pawl bearing assembly at a first radial distance from a longitudinal axis of the movable element, and a second position in relation to the housing in which the contact surface abuts the pawl bearing assembly at a second radial distance from the longitudinal axis whereby to exert less pressure against the bearing assembly than in the first position. The first position of the movable element is actuated by removal of the lever from the housing thereby causing greater bearing pressure on the bearing assembly and thus on the pawl thereby restraining it against movement. The second position of the movable element is actuated by connection of the lever to the housing thereby causing a reduction in bearing pressure on the bearing assembly and thereby releasing the pawl for reciprocation and movement about the gear teeth.

The foregoing was intended as a summary only and of only some of the aspects of the invention. It was not intended to define the limits or requirements of the invention. Other aspects of the invention will be appreciated by reference to the detailed description of the preferred embodiments. Moreover, this summary should be read as though the claims were incorporated herein as it is the intention that the claims also inform and be part of the present description.

BRIEF DESCRIPTION OF THE DRAWINGS

The invention will be described by reference to the detailed description of the preferred embodiment and to the drawings thereof in which.

DETAILED DESCRIPTION OF THE PREFERRED EMBODIMENT

Referring first to FIGS. 1, 2, 3 and 4, the ratchet assembly according to the preferred embodiment of the invention is generally designated by the numeral 10. The principal components of the ratchet are the gear 12, the gear teeth 14, the pawl 16 and the housing 18. A removable lever 20 is used to engage the ratchet assembly 10 and to crank the gear. Lever 20 may selectively be connected to or removed from housing 18 as will be described below.

Figure 2:
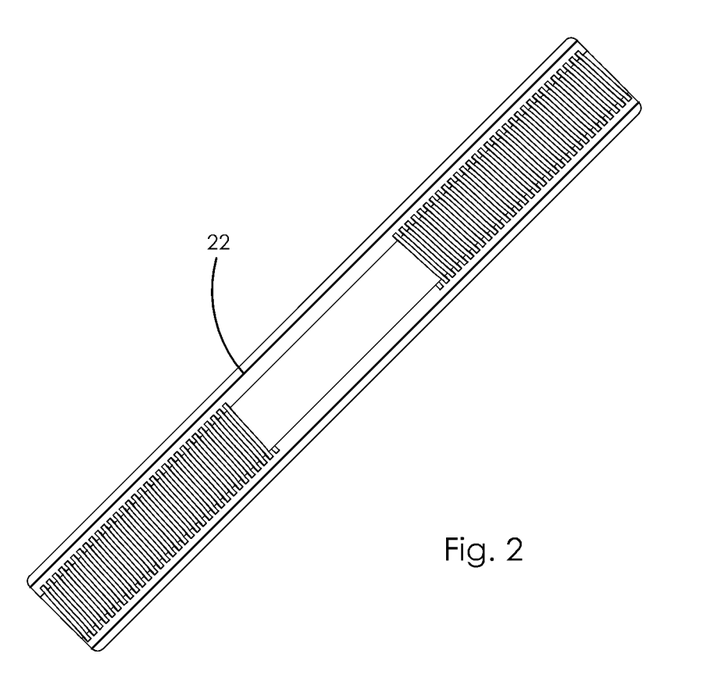
FIG. 2 is a longitudinal cross-section of the body portion of a partially threaded sleeve.
Figure 3:
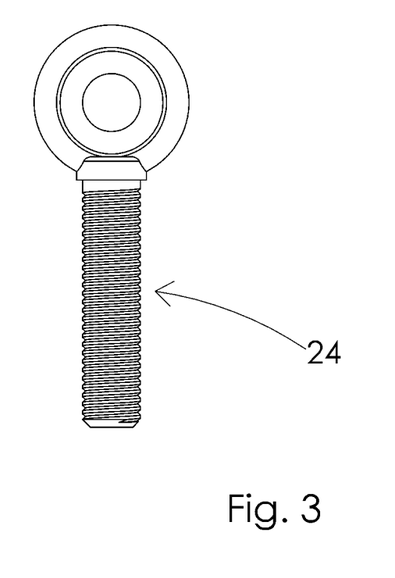
FIG. 3 is a front elevation of an eyelet used to thread into one end of the sleeve.

Gear 12 is secured around a sleeve 22. As seen in FIG. 2, the interior of sleeve 22 is threaded in opposite senses at each end of sleeve 22. Threaded eyelets 24 (FIG. 3) are sized to thread into each end of the sleeve 22. As is well known, turning sleeve 22 in one direction will draw the two eyelets 24 toward one another thereby tightening a chain or strap attached to the eyelets and around a load, while turning it in the opposite direction will have the opposite effect.

Figure 7:
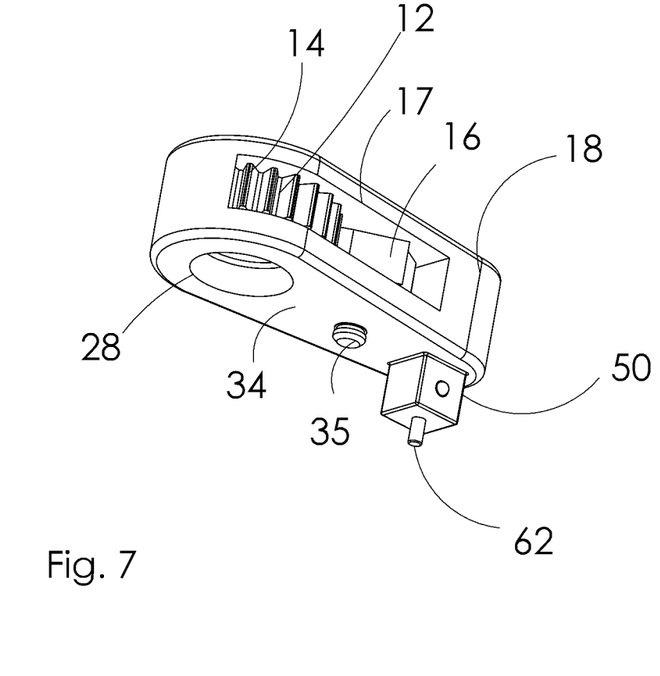
FIG. 7 is a perspective view of the ratchet assembly in which the gear, the pawl, an aperture for receiving the sleeve and a stub for receiving the lever are visible.
Figure 8:
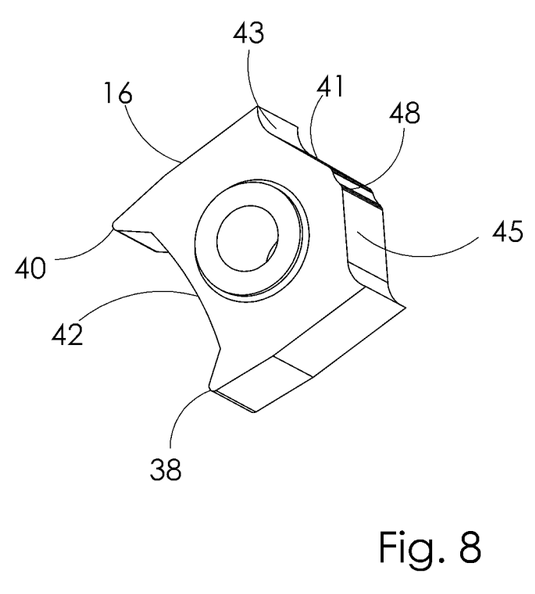
FIG. 8 is a perspective view of the pawl of the preferred embodiment.
Figure 9:
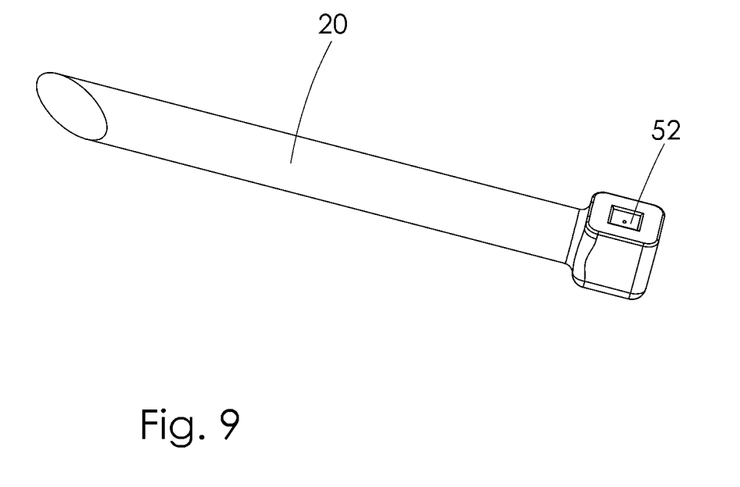
FIG. 9 is an elevation of the lever showing the socket for attaching to the stub.

Housing 18 houses gear 12 and includes opposed apertures 28 (only one being visible in FIG. 7) that are co-axial with gear 12. Apertures 28 accommodate the fitting of the housing 18 about sleeve 22.

Figure 1:
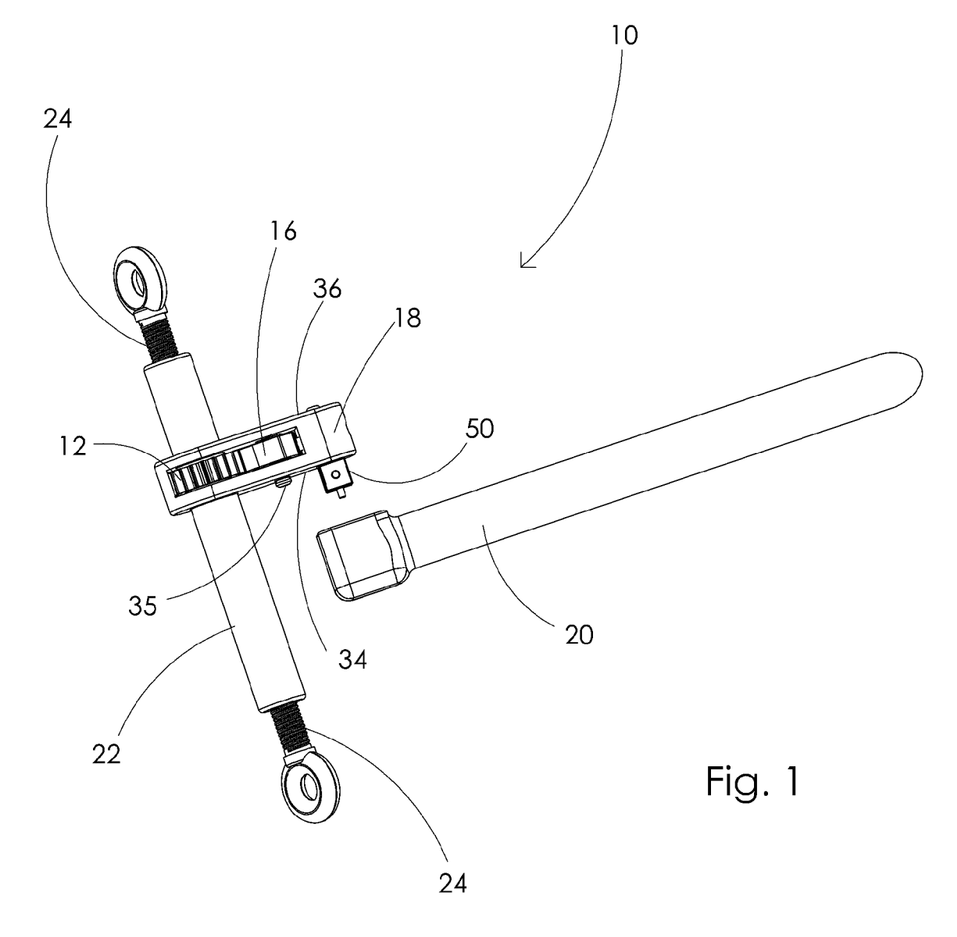
FIG. 1 is a front elevation of the ratchet assembly and a cooperating lever in accordance with the preferred embodiment.
Figure 4:
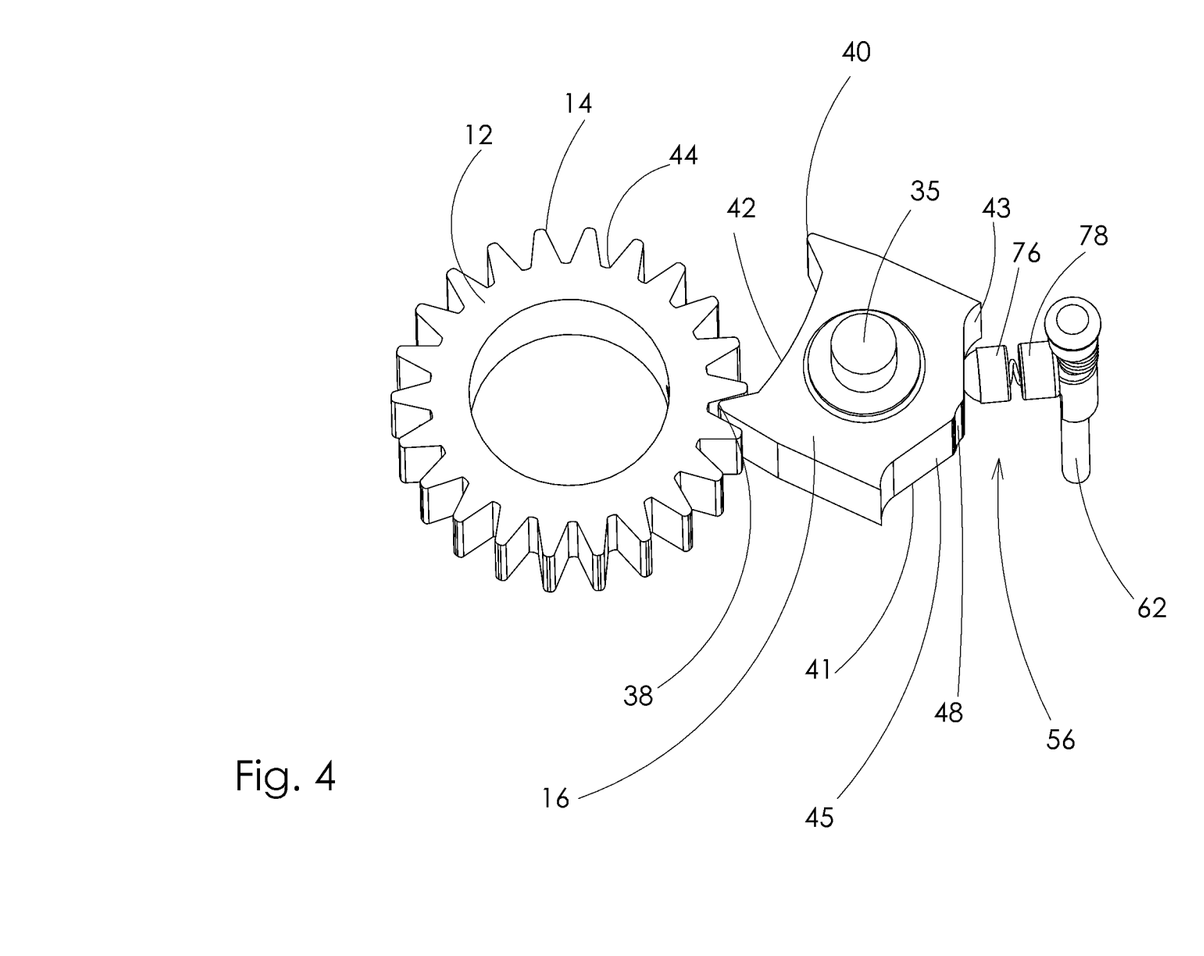
FIG. 4 is a partially perspective view of the gear, pawl, pawl shaft, bearing assembly and pin showing their relationship to one another, with the housing removed.
Figure 5:
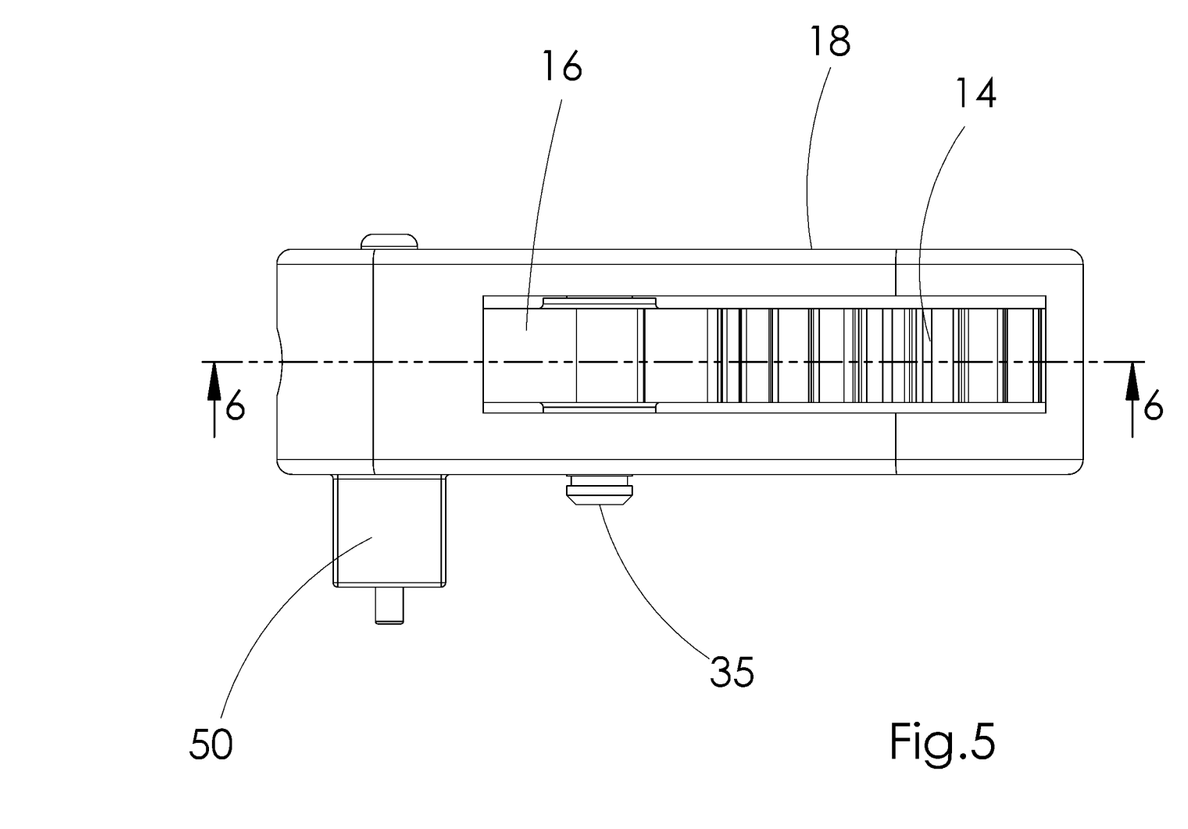
FIG. 5 is top view of the ratchet assembly housing in which the gear and the pawl are visible.

Referring now to FIGS. 1 and 4, pawl 16 is retained in housing 18 about a pawl shaft 35 mounted into opposed side walls 34, 36 of the housing. Pawl 16 is rotatable about shaft 35. Pawl 16 has two catches 38, 40 at opposed ends of the engagement surface 42 of the pawl to engage the gaps 44 between the gear teeth 14. As is well known, in normal operation of the ratchet, pawl 16 reciprocates about shaft 35 such that one of the two catches 38, 40 intermittently engages between the gear teeth 14.

Figure 6:
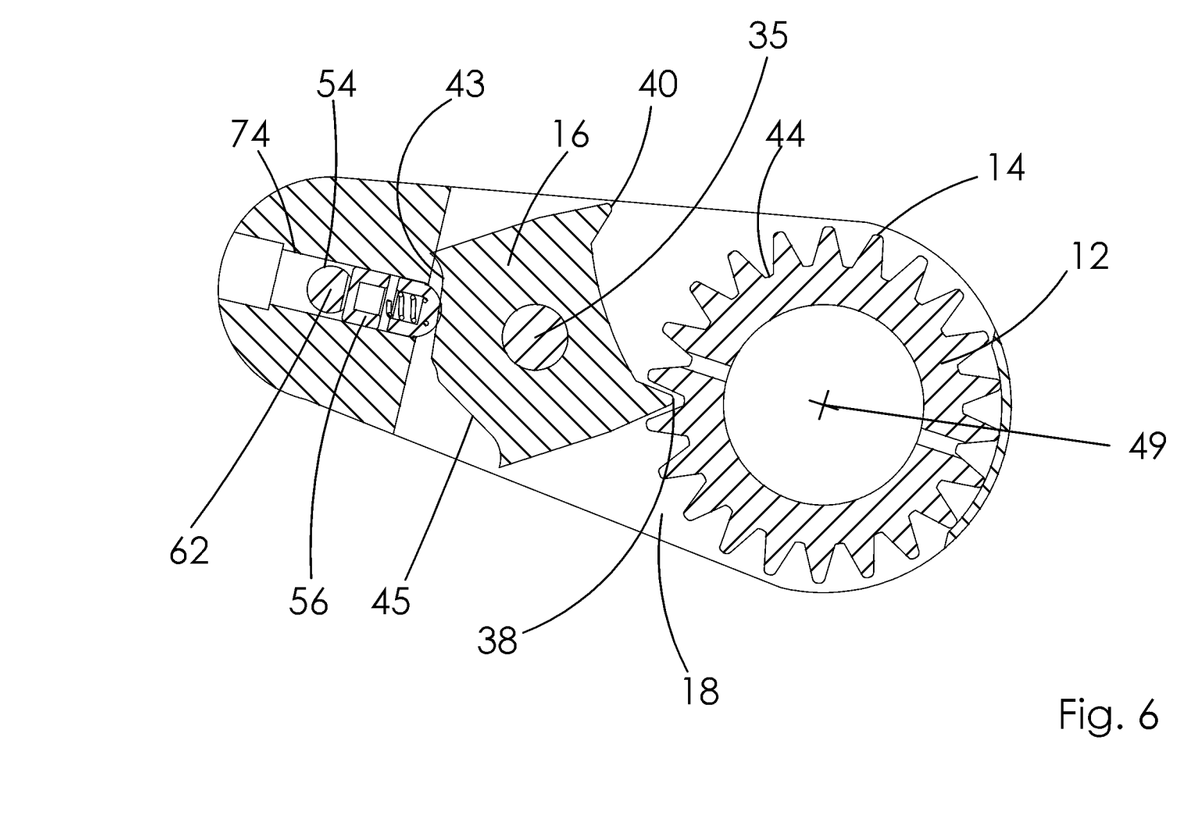
FIG. 6 is a sectional view of the ratchet assembly taken along 6-6 in FIG. 5.

An abutment surface 41 of the pawl 16, generally opposed to engagement surface 42, comprises a central detent 48 used to set the pawl in a neutral position in relation to gear 12 when detent 48 is aligned with shaft 35 and gear axis 49, gear axis 49 being indicated in FIG. 6. At either side of detent 48, surface 41 comprises opposed surfaces 43, 45. When either of opposed surfaces 43 or 45 is aligned with shaft 35 and gear axis 49, the pawl is configured for a particular rotative direction of the gear 12. In FIG. 4, surface 43 is aligned with shaft 35 and gear axis 49 allowing gear 12 to turn in the clockwise direction for the view of FIG. 4. As it turns, catch 38 of pawl 16 rides up the advancing tooth. As it does, pawl 16 seeks to rotate about shaft 35 constrained only by the bias provided by spring 80 in pawl bearing assembly 56 (see FIG. 14 for a better view of spring 80). The pawl bearing assembly 56 is configured such that the spring 80 that forms a part of the assembly has a correct amount of bias to allow the assembly to yield to the rotation of the pawl 16 when the latter rides over a tooth, and to bias the pawl to rotate back into the next adjacent tooth gap 44 when the catch of the pawl has passed over the advancing tooth. It will be appreciated that when the pawl is in a selected rotative position, the angle of the catch in relation to the teeth 14 and the gaps 44 is such as to not allow the gear teeth 14 to ride over the catch in the opposite direction, as is generally understood in the art.

Figure 13:
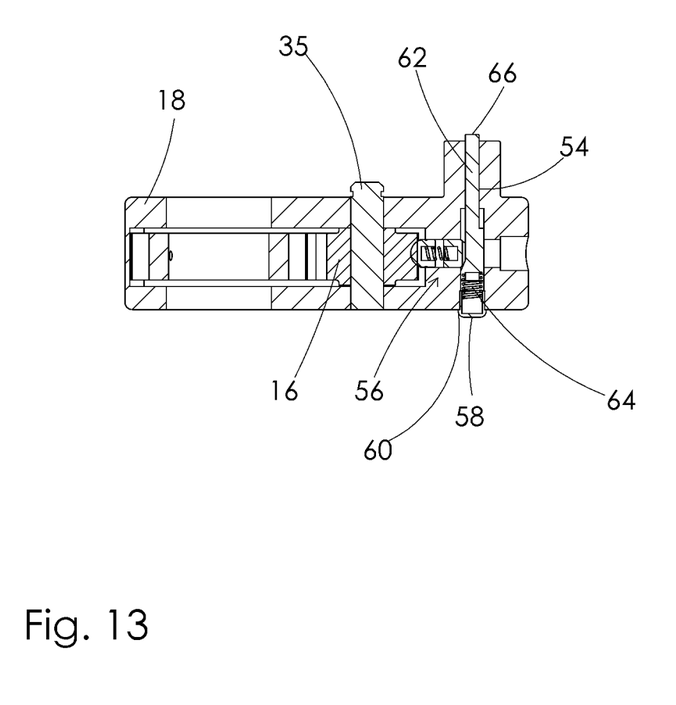
FIG. 13 is a longitudinal cross-section of the ratchet assembly showing the pin in the position it would be in FIG. 12, namely with the lever engaged into the ratchet assembly; and, FIG. 14 is a side elevation of the bearing assembly of the preferred embodiment.

As generally seen in FIGS. 1, 5, 7 and 13, housing 18 includes a laterally extending square shaped stub 50 sized to be received into a square socket 52 at the end of lever 20. A bore 54 extends axially of the stub 50 through the housing 18. Bore 54 is offset from the pawl 16 in the housing 18 to allow for the interposition of a bearing assembly 56 between the bore 54 and the pawl 16. A cap 58 closes the end 60 of bore 54 that is distal from the stub 50 as seen in FIG. 13.

Still referring to FIG. 13, an elongated binder pin 62 extends along bore 54 for axial movement along bore 54 and terminates at a spring 64 that is stopped against cap 58. The spring 64 biases pin 62 to an extended position at which one end 66 of pin 62 protrudes out from stub 50.

Figure 10:
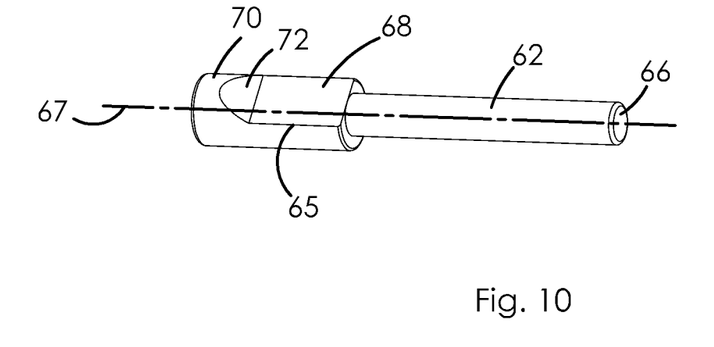
FIG. 10 is a side view of the pin according to the preferred embodiment.

Referring to FIGS. 10 and 13, pin 62 comprises a contact surface 65 that abuts the bearing assembly 56. Contact surface 65 has a first portion 68 that is radially closer to the longitudinal axis 67 of the pin 62 than second portion 70. Portions 68 and 70 are separated by a beveled intersection 72. Pin 62 is effectively wider at portion 70 than at portion 68.

Figure 14:
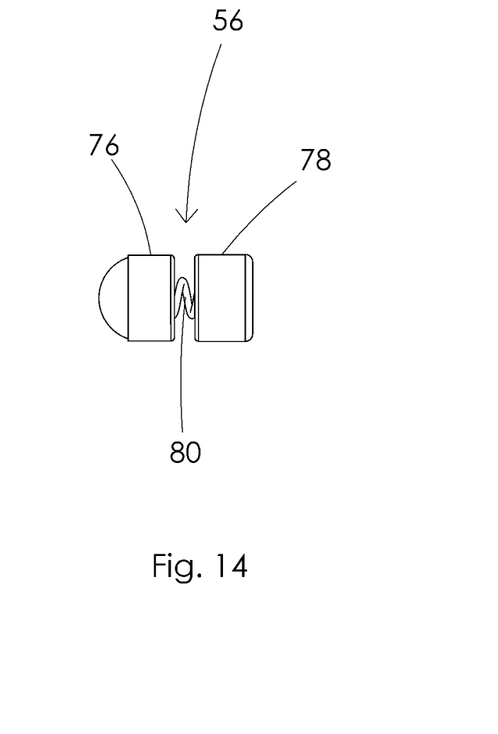

Bearing assembly 56 is housed in a bore 74 (FIG. 6) extending radially from bore 54 and from pin 62 housed therein. Referring to FIG. 14, bearing assembly 56 comprises a first element 76 and a second element 78, each having cavities opening toward the other element. A spring 80 biases elements 76 and 78 away from one another. Such a bias urges the bearing assembly (via element 76) to exert a bearing pressure against the abutment surface 41 of the pawl when the bearing assembly is otherwise constrained on its pin side.

Figure 11:
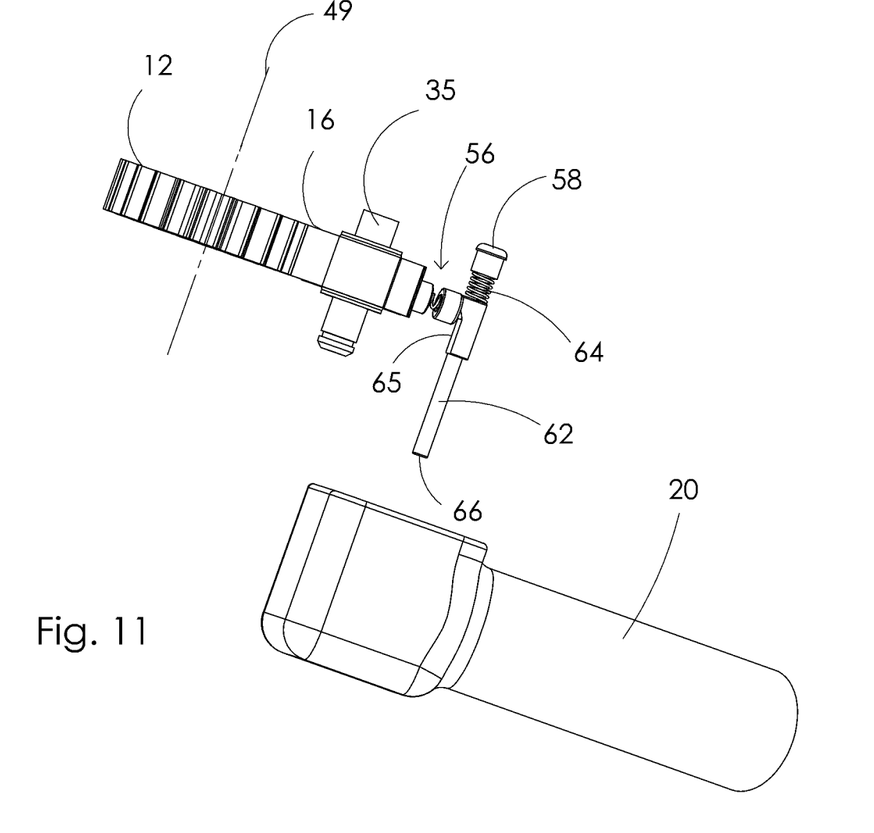
FIG. 11 shows the ratchet assembly and the lever in an unengaged position, but wherein the housing for the ratchet assembly has been omitted.

When lever 20 is not installed over stub 50 as shown in FIG. 11, pin 62 is at rest with end 66 extending out of housing 18 due to the bias provided by spring 64. The length of pin 62 is selected such that in this position, the wider section 70 of pin 62 is aligned with the bearing assembly 56 thereby compressing assembly 56 which in turn bears against surface 41 of pawl 16. The bias provided by spring is 80 in conjunction with the overall dimensions of the bearing assembly 56 are selected such that the pressure from the bearing assembly 56 bearing on the surface 41 of pawl 16 effectively locks pawl 16 against displacement when the pin 62 is in this extended position.

Figure 12:
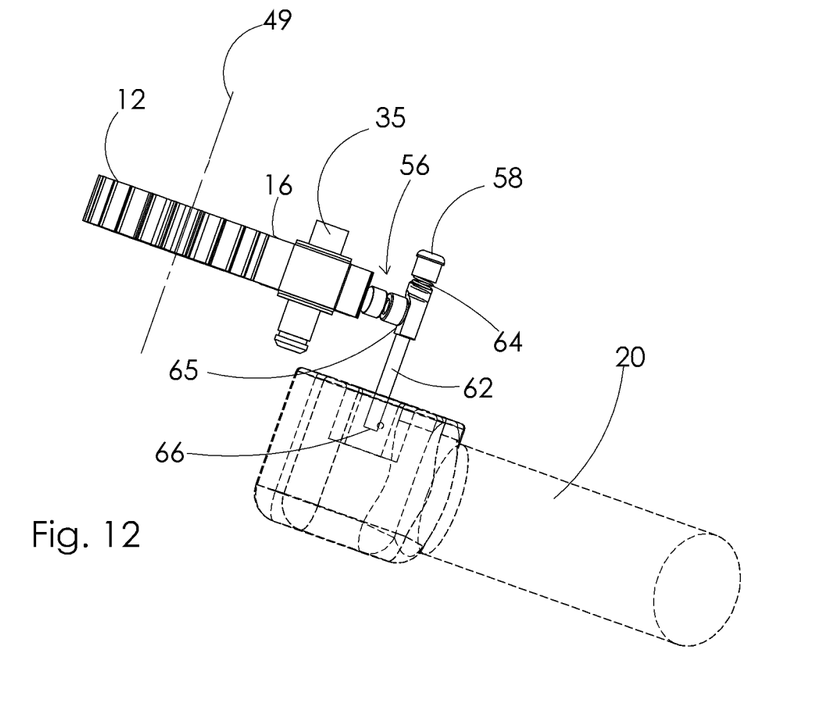
FIG. 12 is the view of FIG. 11 but wherein the lever is engaged into the ratchet assembly whereby to urge the pin into the housing of the assembly.

When lever 20 is secured over stub 50 as in FIG. 12, end 66 of pin 62 is pressed inward and translates pin 62 axially against the bias of spring 64 to an inserted position in relation to the housing 18. The displacement of pin 62 moves the wider portion 70 of pin 62 away from bearing assembly 56 which then abuts the narrower portion 68 of pin 62. This position provides room for the extension of elements 76 and 78 (elements of the bearing assembly 56) away from one another, relieving the bias of spring 80 and reducing the bearing pressure of bearing assembly 56 on pawl 16. This allows pawl 16 to assume a normal mode of operation wherein the pawl can reciprocate over the gear teeth 14 and can be adjusted to various operational positions. In this inserted position of pin 62, bearing assembly 56 still exerts sufficient pressure on surface 41 to retain the pawl 16 in either rotative direction or in the neutral position, depending on whether the bearing assembly abuts surfaces 43 or 45 or detent 48 of the abutment surface 41 of the pawl 16.

It will be appreciated that the invention provides for a ratchet load binder that automatically locks the pawl when a reversible lever is removed. The same mechanism operates as a pawl mode setting mechanism (either rotative direction or neutral) during normal operation of the ratchet.

In the foregoing specification, the invention has been described with reference to specific embodiments thereof. However, the scope of the claims should not be limited by the preferred embodiments set forth in the examples, but should be given the broadest interpretation consistent with the description as a whole. The is specification and drawings are, accordingly, to be regarded in an illustrative rather than a restrictive sense.

The invention claimed is:

1. A ratchet assembly comprising:
    a housing, a gear, teeth on said gear and a pawl rotatably mounted for reciprocating engagement between said teeth of said gear;
    a lever adapted for selective connection or removal from said housing; and
    a pawl bearing assembly extending between a surface of said pawl and a biased movable element whose movement is actuated by the connection or removal of said lever from said housing.

2. The ratchet assembly of claim 1 wherein pawl bearing assembly is biased toward exerting a bearing pressure on said surface of said pawl.

3. The ratchet assembly of claim 2 wherein said movable element has an extended position in which a portion of said movable element extends outside said housing and an inserted position in which said portion of said movable element is in said housing, and wherein said bearing pressure is greater when said movable element is in said extended position than when said movable element is in said inserted position.

4. The ratchet assembly of claim 1 or claim 3 wherein:
    said housing comprises a shaped portion for removably receiving said lever;
    said movable element has an extended position in which a portion of said movable element extends outside said housing and an inserted position in which said portion of said movable element is in said housing; and,
    connection of said lever to said shaped portion of said housing causes the insertion of said portion of said movable element into said housing.

5. The ratchet assembly of claim 2 or claim 3 wherein:
    said movable element has at least two positions in relation to said housing;
    said movable element has a contact surface in engagement with said bearing assembly;
    said contact surface varies axially along a length of said movable element such that a pressure exerted by said movable element on said bearing assembly, and therefore on the pawl, varies according to said positions of said movable element.

6. The ratchet assembly of claim 4 wherein:
    said movable element is elongated and has a contact surface in engagement with said bearing assembly;
    said contact surface varies axially along a length of said movable element such that a pressure exerted by said movable element on said bearing assembly, and therefore on said pawl, varies according to whether said movable element is in said extended or in said inserted position; and, said movable element is translated axially along a bore in said housing to said inserted position when said lever is connected to said housing.

7. The ratchet assembly of claim 6 wherein in said extended position of said movable element, a first portion of said contact surface abuts said bearing assembly, in said inserted position of said movable element, a second portion of said contact surface abuts said bearing assembly, said second portion of said contact surface being closer to a longitudinal axis of said movable element than said first portion of said contact surface.

8. The ratchet assembly of claim 7 wherein said bearing assembly comprises two components that are spring biased to extend away from one another.

9. The ratchet assembly of claim 4 wherein:

said movable element has at least two positions in relation to said housing;

said movable element has a contact surface in engagement with said bearing assembly;

said contact surface varies axially along a length of said movable element such that a pressure exerted by said movable element on said bearing assembly, and therefore on the pawl, varies according to said positions of said movable element.

10. The ratchet assembly of claim 1 wherein said bearing assembly comprises two components that are spring biased to extend away from one another.

11. A ratchet assembly comprising:

a housing, a gear, teeth on said gear and a pawl rotatably mounted for reciprocating engagement between said teeth of said gear;

a pawl bearing assembly extending between a surface of said pawl and a biased movable element whose movement is actuated by the connection or removal of a lever from said housing, said pawl bearing assembly being biased toward exerting a bearing pressure on said surface of said pawl;

said movable element having a first position in relation to said housing in which a contact surface of said movable element abuts said pawl bearing assembly at a first radial distance from a longitudinal axis of said movable element, and a second position in relation to said housing in which said contact surface of said movable element abuts said pawl bearing assembly at a second radial distance from said longitudinal axis whereby to exert less pressure against said bearing assembly than in said first position; and, said first position of said movable element being actuated by removal of said lever from said housing thereby causing greater bearing pressure on said bearing assembly and thus on said pawl thereby restraining said pawl against movement, and said second position of said movable element being actuated by connection of said lever to said housing thereby causing a reduction in bearing pressure on said bearing assembly and thereby releasing said pawl for reciprocation and movement about said gear teeth.

* * * * *